US012744249B2

(12) United States Patent
Rustomji et al.

(10) Patent No.: US 12,744,249 B2
(45) Date of Patent: Sep. 22, 2026

(54) REDUCED VAPOR PRESSURE LIQUEFIED GAS ELECTROLYTES USING HIGH CONCENTRATION SALT

(71) Applicant: SOUTH 8 TECHNOLOGIES, INC., San Diego, CA (US)

(72) Inventors: Cyrus S. Rustomji, San Diego, CA (US); Aleksandr Aleshin, San Diego, CA (US); Jungwoo Lee, San Diego, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 18/131,616

(22) Filed: Apr. 6, 2023

(65) Prior Publication Data

US 2023/0327206 A1 Oct. 12, 2023

Related U.S. Application Data

(60) Provisional application No. 63/328,480, filed on Apr. 7, 2022, provisional application No. 63/391,220, filed on Jul. 21, 2022.

(51) Int. Cl.
*H01M 10/0569* (2010.01)
*H01M 10/0568* (2010.01)

(52) U.S. Cl.
CPC ... *H01M 10/0569* (2013.01); *H01M 10/0568* (2013.01); *H01M 2300/0028* (2013.01); *H01M 2300/0045* (2013.01)

(58) Field of Classification Search
CPC ......... H01M 10/0569; H01M 10/0568; H01M 2300/0028; H01M 2300/0045
See application file for complete search history.

(56) References Cited

U.S. PATENT DOCUMENTS 9,601,803 B2 * 3/2017 He .................... H01M 10/0568
11,431,026 B1 * 8/2022 Chinnam ............ H01M 10/056
12,136,702 B2 * 11/2024 Rustomji .......... H01M 10/0569
2018/0375156 A1 * 12/2018 Zhamu .............. H01M 10/0568
2020/0067130 A1 * 2/2020 Rustomji .......... H01M 10/0569
2020/0274134 A1 * 8/2020 Park .................. H01M 10/0569
2021/0313611 A1 * 10/2021 Rustomji .......... H01M 10/0569

OTHER PUBLICATIONS

Yang, Yangyuchen et al. "Liquefied gas electrolytes for wide-temperature lithium metal batteries"; Energy & Environmental Science (2020), 13(7), 2209-2219.*

* cited by examiner

*Primary Examiner* — Laura Weiner
(74) *Attorney, Agent, or Firm* — Manuel de la Cerra

(57) ABSTRACT

Disclosed are novel electrolytes based on liquefied gas and high concentration of salt in liquefied gas electrolytes. Unlike common electrolytes, liquefied gas electrolytes utilize solvents which are gaseous under standard conditions. The current disclosure describes electrolytes which consist of a solvent comprised of one or more solvents, wherein one or more of those solvents are a liquefied gas solvent, and a salt or combination of salts at high enough concentration such that the combination of solid salt and liquefied gas solvent results in a reduced vapor pressure electrolyte or even a liquid electrolyte mixture with vapor pressure below that of atmospheric pressure at a temperature of 293.15K.

9 Claims, 5 Drawing Sheets

Figure 2:
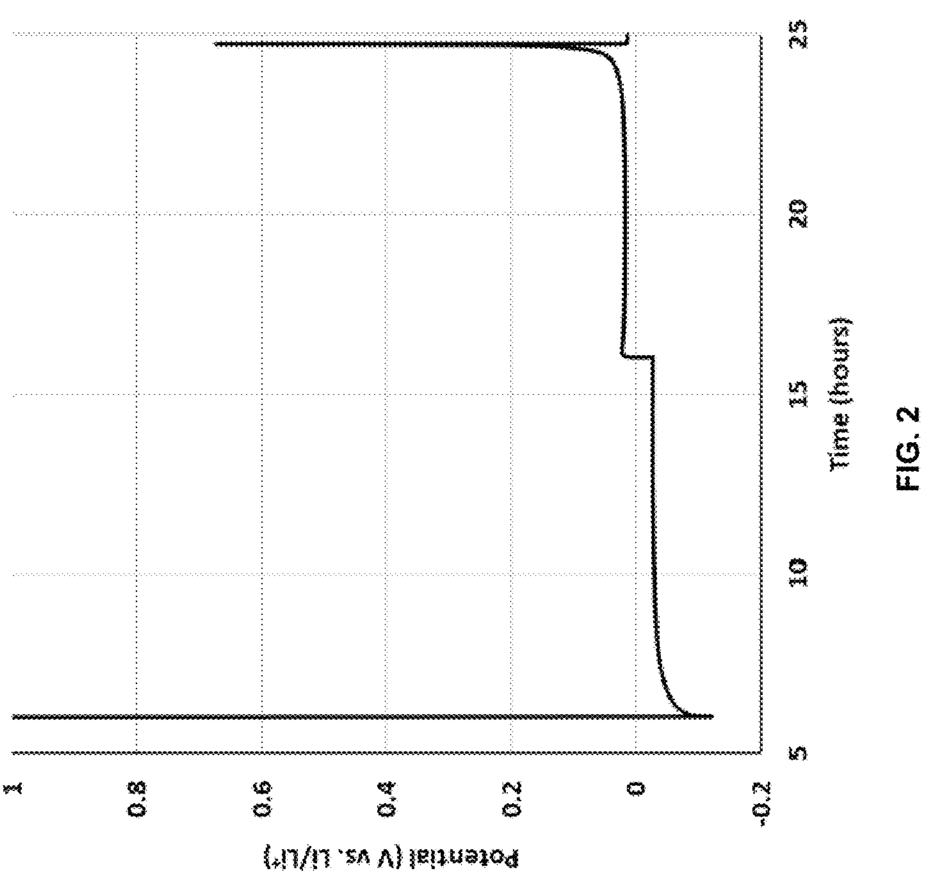

| Figure | Salt-to-Solvent Molar Ratio |
|---|---|
| A | 3:1 |
| B | 2:1 |
| C | 1:1 |
| D | 1:2 |
| E | 1:3 |
| F | 1:4 |
| G | 1:5 |
| H | 1:6 |

REDUCED VAPOR PRESSURE LIQUEFIED GAS ELECTROLYTES USING HIGH CONCENTRATION SALT

1.0 CROSS-REFERENCE TO RELATED APPLICATIONS

This application is also related to the applications filed below and the contents of each of these applications are hereby incorporated by reference in their entirety: PCT/US20/048660 filed on Aug. 30, 2020; PCT/US20/020547 filed on Feb. 29, 2020; PCT/US20/048661 filed on Aug. 30, 2020; PCT/US19/032413 filed on May 15, 2019; PCT/US19/032414 filed on May 15, 2019; PCT/US14/066015 filed on Nov. 17, 2014; PCT/US20/026086 filed on Apr. 1, 2020; PCT/US17/029821 filed on Apr. 27, 2017; PCT/US22/031594 filed on May 31, 2022; PCT/US23/11864 filed on Jan. 30, 2023; Provisional Application 63/328,480 filed on Jul. 7, 2022; Provisional Application 63/391,224 filed on Jul. 21, 2022; Provisional Application 63/418,703 filed on Oct. 24, 2022; Provisional Application 63/418,704 filed on Oct. 24, 2022; and Provisional Application 63/306,393 filed on Feb. 3, 2022.

This application claims priority to U.S. Provisional Application 63/328,480 filed on Apr. 7, 2022 and to U.S. Provisional Application 63/391,220 filed on Jul. 21, 2022. The contents of these applications are incorporated by reference.

2.0 FIELD OF THE INVENTION

Embodiments of the invention relate to compositions and to the chemical formulations of electrolytes for use in electrochemical energy devices, such as batteries and electrochemical capacitors. Devices using the compositions and methods of use of the compositions are also provided.

3.0 BACKGROUND

Electrochemical devices, such as batteries or capacitors, employ ionically conducting, electrically insulating electrolytes to carry charge between a negative and positive electrode. These electrolytes are typically liquid at room temperature and atmospheric pressure (293.15K and 100 kPa), or standard conditions, and consist of an approximately 1.0 M salt in solvent mixture and optional additives which may be solid, liquid, or gaseous under standard conditions. Salt and solvent molecules exist in so-called "solvation shells" where positive and negative ions are typically surrounded by solvent, additive and other positive and negative ions. These solvation shells affect all aspects of the device, from cyclability to safety and depend on concentrations and compositions of the electrolyte formulations.

It is known that liquefied gas electrolytes can improve the performance of electrochemical devices through higher power, higher energy, temperature performance, or safety. However, most liquefied gas solvent, additive and salt mixtures are plagued by vapor pressures far above atmospheric pressure (>100 kPa) which make handling and constructing devices more difficult.

There is a need, therefore, for an electrolyte that has a reduced vapor pressure to overcome these deficiencies.

4.0 SUMMARY

Disclosed are novel electrolytes based on liquefied gas and high concentration of salt in liquefied gas electrolytes. Unlike common electrolytes, liquefied gas electrolytes utilize solvents which are gaseous under standard conditions. The current disclosure describes electrolytes which consist of a solvent which is comprised of one or more solvents, wherein one or more of those solvents are a liquefied gas solvent, and a salt or combination of salts at high enough concentration such that the combination of solid salt and liquefied gas solvent results in an electrolyte with a reduced vapor pressure from the base solvent alone. The vapor pressure may be reduced considerably to even yield a liquid electrolyte mixture with vapor pressure below that of atmospheric pressure at a temperature of 293.15K, allowing for handling of the electrolyte mixture as a liquid. The large amount of salt aids in creating a stable electrode-electrolyte interface (SEI), which may increase cell cycle life performance or lower impedance electrode-electrolyte interphases which allows for high power capability. Improved SEI formation is thought to result from more contact-ion pairs (CIPs) and aggregates in the solvation shell, where the salt cation and anion are still in contact and not separated by solvent and may lead to the anion reducing before the solvent. This typically results in a more dense, inorganic SEI compared to less dense, organic SEIs formed from solvent reduction. Further, reducing the amount of solvent in the device can lower the cost and the lower vapor pressure simplifies manufacturability of the electrolyte and electrochemical devices the electrolyte is used in by allowing for cell housings that have thinner walls which leads to lower mass, volume and cost.

Figure 1:
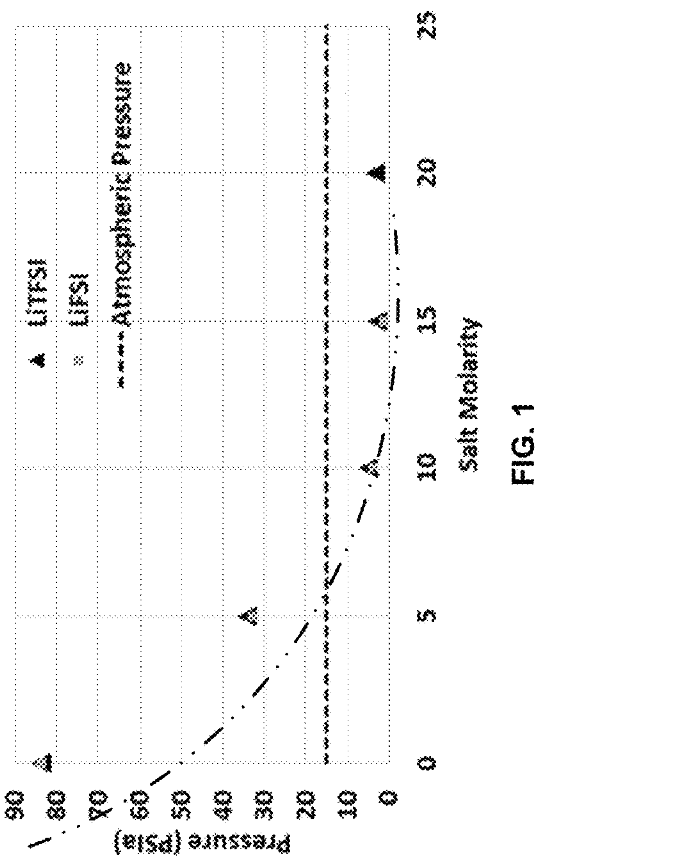

Unlike conventional liquefied gas electrolytes, however, these electrolytes when mixed with large amounts of salt attain lower vapor pressures as shown in FIG. 1. This allows for the use of liquefied gas in the electrolyte without the mechanical or manufacturing constraints high vapor pressure solvents impose which may simplify manufacturing, lower battery cell housing mass, and reduce cost.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 1 illustrates the electrolyte pressure at room temperature of various liquefied gas electrolytes containing increasing molar concentration of lithium salts, lithium bis(trifluoromethanesulfonyl)imide (LiTFSI) and lithium bis(fluorosulfonyl)imide (LiFSI) compared to pure solvent dimethyl ether (Me2O), shown with 0 M salt concentration.

FIG. 2 illustrates the performance of a battery coin cell at room temperature using a lithium metal counter and reference electrode while plating and then stripping lithium metal electrochemically in 15.0 M LiFSI in Me2O onto a stainless steel cathode. The coin cell is constructed in a housing enclosing the ionically conducting electrolyte under a pressurized condition to maintain the electrolyte in a liquid phase.

Figures 3, 4:
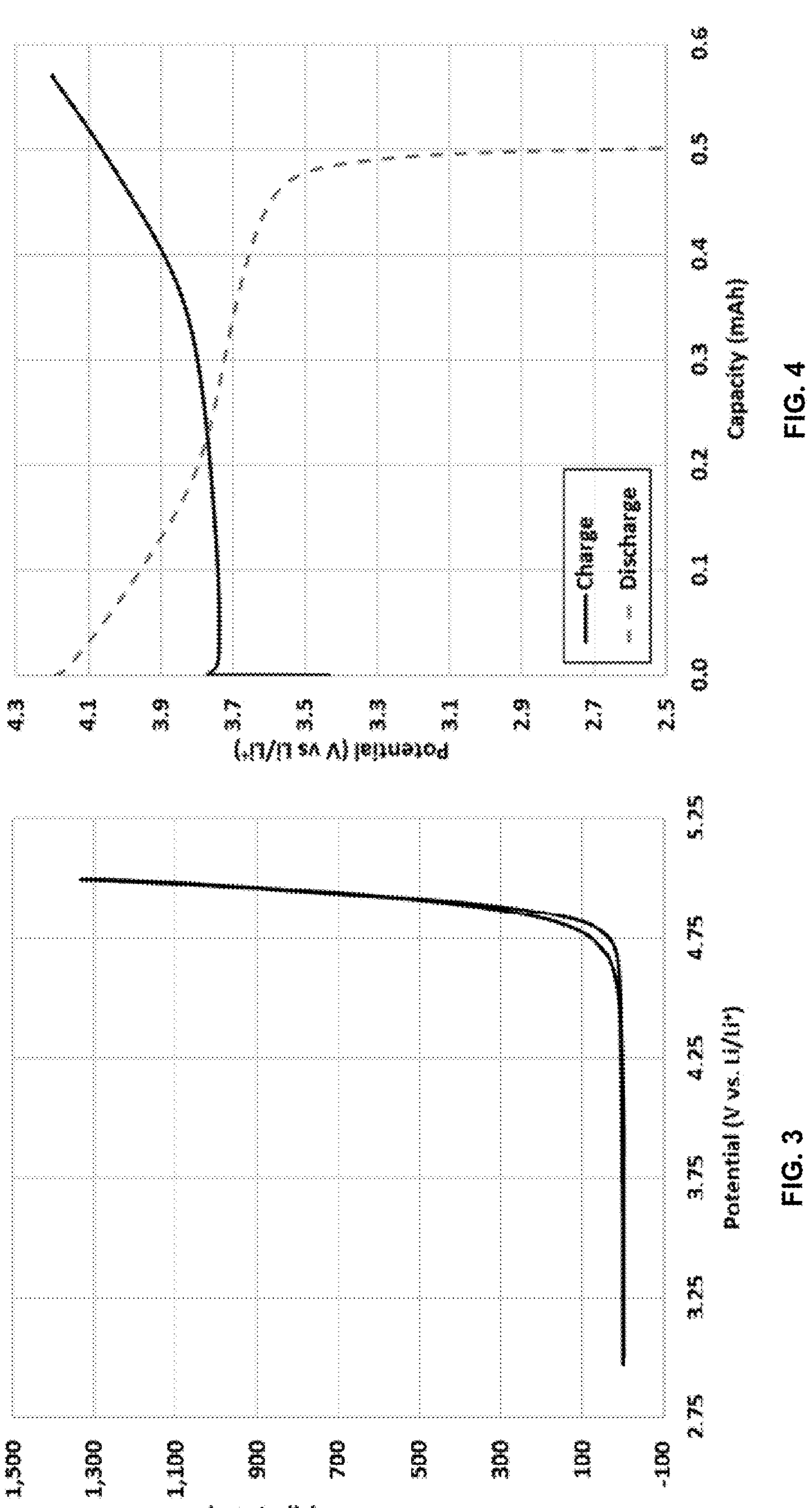

FIG. 3 illustrates the performance of a battery coin cell at room temperature using a lithium metal anode while linearly scanning the potential against a carbon cathode in a 15.0M LiFSI in Me2O electrolyte. The coin cell is constructed in a housing enclosing the ionically conducting electrolyte under a pressurized condition to maintain the electrolyte in a liquid phase and the anode and the cathode are in contact with the ionically conducting electrolyte.

FIG. 4 illustrates the performance of a battery coin cell at room temperature using a lithium metal anode and a lithium nickel-cobalt-manganese oxide (NMC 622) cathode and a 15.0 M LiFSI in Me2O electrolyte. The coin cell is constructed in a housing enclosing the ionically conducting electrolyte under a pressurized condition to maintain the electrolyte in a liquid phase.

Figure 5:
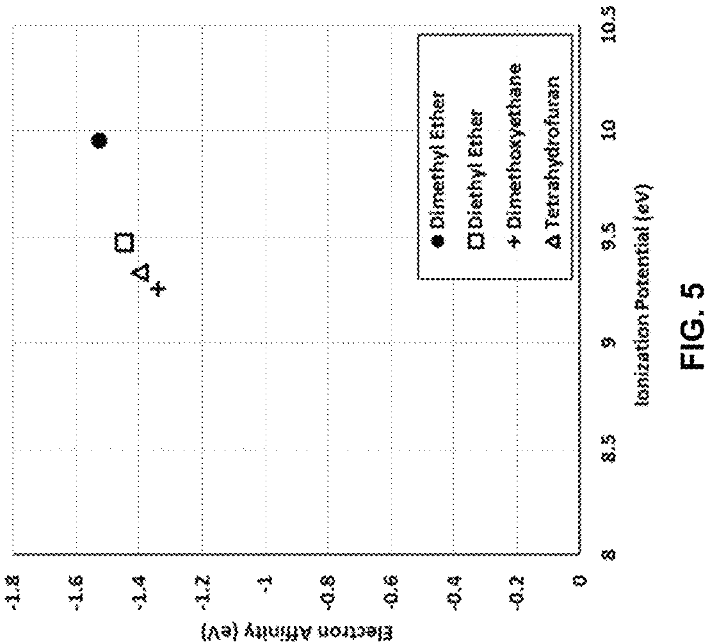

FIG. 5 compares dimethyl ether (C2H6O) to the closest two other linear ethers which are liquids at room temperature, diethyl ether (C4H10O) and 1,2-dimethoxyethane (C4H10O2). The electronic properties of dimethyl ether (an ionization potential of about 9.9 eV and electron affinity of about −1.55 eV) are computed to be superior to these solvents and tetrahydrofuran, a cyclic ether.

Figure 6:
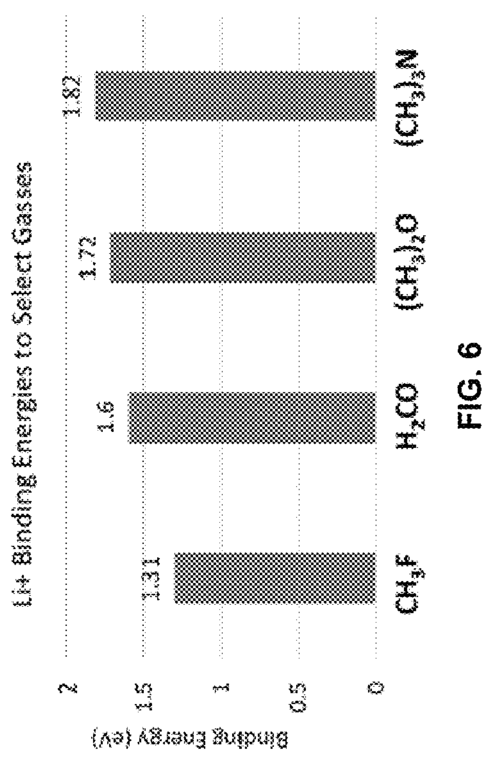

FIG. 6 compares the binding energies of four different liquefied gas solvent types: fluoromethane (CH3F), formaldehyde (H2CO), dimethyl ether ((CH3)2O), and trimethyl amine ((CH3)3N). The calculations were compared for a single solvent molecule binding to a single lithium cation. It is shown that the binding energy of formaldehyde (1.6 eV), dimethyl ether (1.72 eV) and trimethyl amine (1.82 eV) are substantially higher than fluoromethane (1.31 eV).

Figure 7:
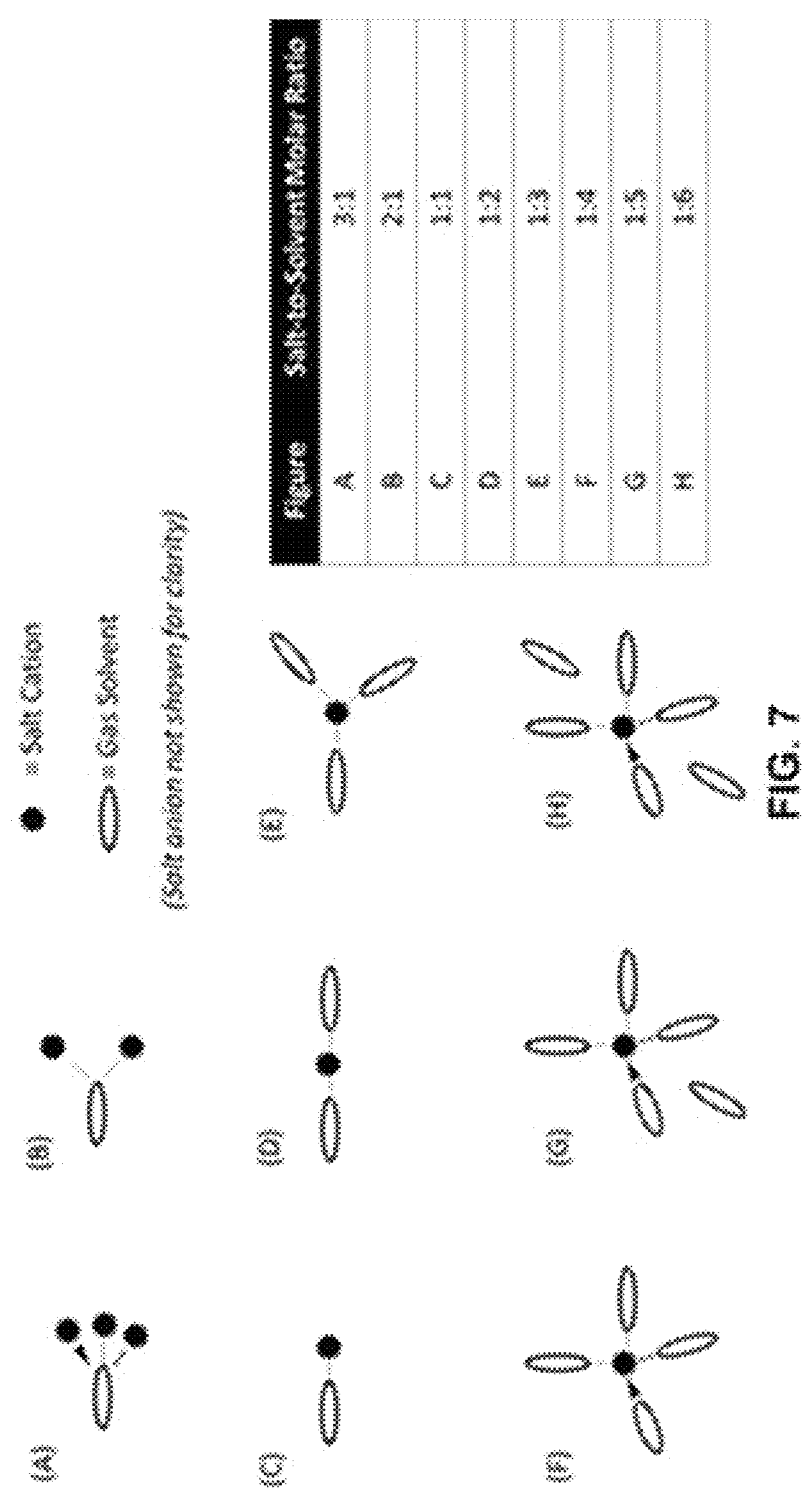

FIG. 7 is a graphic rendering of the solvation shell of a solvent molecule around a single cation (anion is not included for clarity). Various salt to solvent ratios are shown from 3:1, 2:1, 1:1, 1:2, 1:3, 1:4, 1:5, 1:6. Because at a ratio of 1:4, the solvation sphere is essentially complete, there is less binding energy of any additional solvent to the cation at the 1:5 of 1:6 ratios, which leads to a higher vapor pressure.

Figure 8:
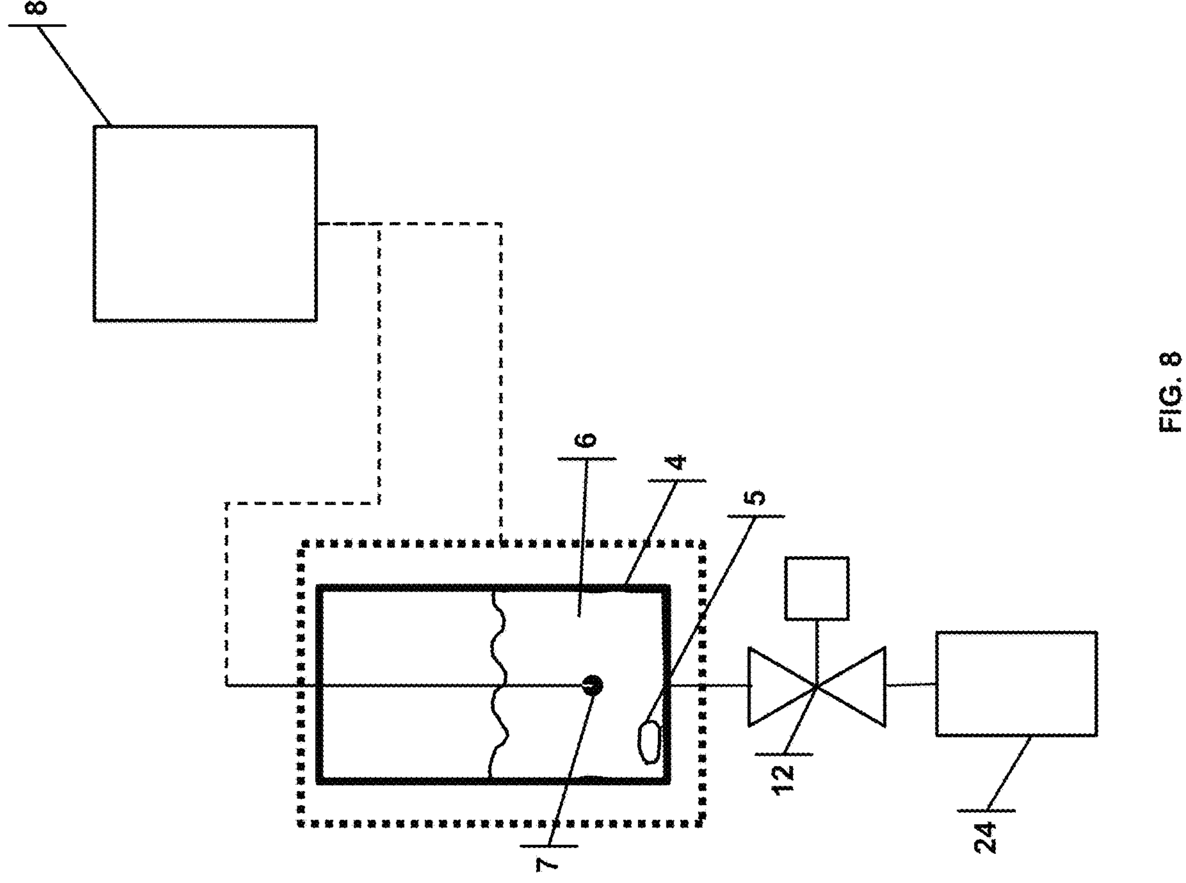

FIG. 8 is a block diagram showing an embodiment of an apparatus for liquefied gas electrolyte mixture dispensing to a secondary container.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well-known to persons of skill in the art have not been described in detail so as not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

It is known that liquefied gas electrolytes can improve the performance of electrochemical devices through higher power, higher energy, temperature performance, or safety. However, most liquefied gas solvent, additive and salt mixtures are plagued by vapor pressures considerably above atmospheric pressure (>100 kPa) which make handling and constructing devices more difficult and requiring thicker housing walls which might increase mass, volume, and cost.

Disclosed are novel electrolytes based on liquefied gas and high concentration of salt in liquefied gas electrolytes. Unlike common electrolytes, liquefied gas electrolytes utilize solvents which are gaseous under standard conditions. The current disclosure describes electrolytes which consist of a solvent which is comprised of one or more solvents, wherein one or more of those solvents are a liquefied gas solvent, and a salt or combination of salts at high enough concentration such that the combination of solid salt and liquefied gas solvent results in an electrolyte with a reduced vapor pressure from the base solvent alone. The vapor pressure may be reduced considerably to even yield a liquid electrolyte mixture with vapor pressure below that of atmospheric pressure at a temperature of 293.15K, allowing for handling of the solid-gas mixture as a liquid. The large amount of salt aids in creating both a stable electrode-electrolyte interface (SEI) and reducing the amount of solvent in the device as well as simplifying manufacturability of the electrolyte and electrochemical devices the electrolyte is used in. Improved SEI formation is thought to result from more contact-ion pairs (CIPs) and aggregates in the solvation shell, where the salt cation and anion are still in contact and not separated by solvent and may lead to the anion reducing before the solvent. This typically results in a more dense, inorganic SEI compared to less dense, organic SEIs formed from solvent reduction.

It has been discovered through considerable experimentation that, unlike conventional liquefied gas electrolytes, certain formulations of liquefied gas electrolytes with large amounts of salt can attain vapor pressures below atmospheric pressure at room temperature while using a liquefied gas solvent which has a vapor pressure above atmospheric pressure at room temperature as seen in FIG. 1. This is believed to be due to the tight binding of the solvent with lithium ions and salt anions, as shown in FIG. 7. An example of a liquefied gas solvent which shows this phenomenon is dimethyl ether. The resulting lower vapor pressure at high enough salt concentrations above about 7 M allows for handling the liquefied gas electrolyte as if it were a liquid at room temperature and pressures. It would not have been obvious previously to those skilled in the art that increasing the molarity of lithium salt in a liquefied gas solvent, such as dimethyl ether, would maintain these highly desirable qualities without experimentation, formation and study of these electrolyte compositions inside battery devices. As a point of comparison, a salt to solvent molar ratio of 1 mole of LiTFSI to 2 moles dimethyl ether salt yields a concentration of 3.65 M, which shows a vapor pressure reduction from 86 psi for the pure dimethyl ether solvent down to roughly 40 psi, which is a reduction of 53% the vapor pressure. This substantial reduction in vapor pressure will yield a reduction in structural requirement for the cell housing, allowing for thinner cell housing walls, reduced mass, and reduced volume.

FIG. 7 is a graphic rendering of the solvation shell of a solvent molecule around a single cation (anion is not included for clarity). Various salt to solvent ratios are shown from 3:1, 2:1, 1:1, 1:2, 1:3, 1:4, 1:5, 1:6. A solvent molecule will generally show a tight binding to the salt cation if the solvent molecule is within the salts first solvation sphere where the solvent molecule is tightly bound to the cation. Solvent in a secondary solvation sphere may also show some binding to the salt cation, but at a reduced energy from the first solvation sphere. This tight binding reduces the free energy of the molecule, thereby reducing its kinetic energy and thus reducing its effective vapor pressure. Thus with too much solvent, the vapor pressure is more dictated by the free solvent molecules which have little attraction to the cation, thereby yielding a higher vapor pressure electrolyte.

An electrolyte salt concentration may be described both as a molarity (moles of salt per unit volume of mixed electrolyte) or a salt to solvent ratio. For example an electrolyte with 1 part LiTFSI and 2 parts dimethyl ether is equivalent to a molar concentration of about 3.65 moles per liter (M). This concentration yields an electrolyte having a reduced vapor pressure of about 40 psi, which is about a 53% reduction from that of the pure solvent of 86 psi at room temperature. It is also shown that at a salt molarity of 10 M, the vapor pressure is reduced so significantly that the electrolyte vapor pressure is below that of atmosphere, effectively providing a liquid electrolyte.

It can be seen that for gaseous solvents with strong attraction to a salt cation, a high concentration of salt will yield lower vapor pressures. FIG. 6 compares the binding energies of four different liquefied gas solvent types: fluoromethane (CH3F), formaldehyde (H2CO), dimethyl ether ((CH3)2O), and trimethyl amine ((CH3)3N). The calculations were compared for a single solvent molecule binding to a single lithium cation. It is shown that the binding energy of formaldehyde (1.6 eV), dimethyl ether (1.72 eV) and trimethyl amine (1.82 eV) are substantially higher than fluoromethane (1.31 eV). It has been observed that fluoromethane is only weakly coordinating to lithium salts and is difficult to increase salt concentration in the pure solvent without salt precipitation out of solution. In contrast, formaldehyde, dimethyl ether, and trimethyl amine show excellent solubility for high concentrations of salt. It is known that the carbonyl oxygen, ether oxygen, and amine nitrogen show high binding to salt cations, but it is surprising to see this binding is so strong as to allow for high salt concentrations in liquefied gas solvents and substantial lowering of the gas vapor pressure of the mixed electrolytes. This behavior is due to the increased binding energy of these solvents to the lithium cation. Further, this effect may be generalized to any liquefied gas having a carbonyl oxygen, ether oxygen, and amine nitrogen.

It is often seen the lowering of the vapor pressure is substantial enough such that the vapor pressure is below that of atmospheric pressure at room temperature, rendering the electrolyte a liquid under standard conditions. Thus, any liquefied gas electrolyte may be handled as a liquid under standard conditions if a high enough concentration of salt is solubilized in the electrolyte mixture to render the vapor pressure of the liquefied gas solvent below that of atmospheric pressure.

The benefits of reducing the vapor pressure of the liquefied gas electrolyte include allowing liquefied gas electrolytes to directly substitute conventional liquid electrolytes in common equipment and liquid handling processes, including manufacturing lines and existing battery and electrochemical device architectures such as pouch and prismatic cells, products and housings. Liquefied gas electrolytes are desirable over conventional liquid electrolytes because gas molecules are typically chemically simpler than common liquid electrolytes. An example of this is dimethyl ether (C2H6O) compared to the closest two other linear ethers which are liquids at room temperature, diethyl ether (C4H10O) and 1,2-dimethoxyethane (C4H10O2). As shown in FIG. 5, the electronic properties of dimethyl ether (an ionization potential of about 9.9 eV and electron affinity of about −1.55 eV) are computed to be superior to these solvents and tetrahydrofuran, a cyclic ether. This translates to improved oxidation and reduction potentials. These larger liquid molecules often have lower electrochemical stability and can decompose under highly oxidative or reductive potentials inside the battery cell. Often, the carbon-carbon bonds in these larger liquid molecules are a weak point in the molecule conducive to this undesirable chemical instability. Smaller molecules which are smaller in size benefit both research and production of electrolytes by reducing chemical complexity in understanding phenomena, computational demands for simulations and costs. Further, the smaller molecular size benefits from a lower viscosity in the electrolyte and thus a higher salt mobility and thus a higher overall electrolyte conductivity. This higher electrolyte conductivity offers a higher power battery. Further, liquid solvents can freeze at low temperatures, rendering a battery cell inoperable. In contrast, the smaller molecular liquefied gas solvents have freezing points far lower than liquid solvents, which allows the electrolytes to operate at significantly lower temperatures. For example, fluoromethane has a freezing point of −138° C., dimethyl ether a freezing point of −141° C., and ammonia has a freezing point of −77° C. This is in contrast to conventional liquid solvents which have higher freezing points, for example ethylene carbonate (−48° C.) and dimethyl carbonate (+2° C.).

It is found that a disclosed formulation aids in achieving a low overpotential for lithium plating and stripping seen in FIG. 2. Further, while ethers are commonly unstable at higher potentials commonly seen in battery devices, FIG. 3 shows the disclosed formulation is stable to 5.0 V without deleterious side reactions. This is also shown in FIG. 4. where the disclosed formulation is used in a battery coin cell with an NMC 622 cathode, exhibiting high first cycle efficiency.

As shown in FIG. 1, the vapor pressure of the pure Me2O solvent at zero salt molarity is approximately 80 psia at room temperature and exceeds normal atmospheric pressure (15 psia, or 100 kPa). As more salt is added the vapor pressure decreases to around 60% at 5 M concentration of salt, although the 5 M electrolyte still possesses a vapor pressure (35 psia) above atmospheric pressure. Electrolytes of 10 M or more, however, possess vapor pressures of around 5 psia or 94% less than no salt, greatly below that of atmospheric pressure. Various amounts of salt addition could be used to reduce the pressure of the electrolyte, for example a salt to solvent ratio of 3 to 1, 2 to 1, 1 to 1, 1 to 2, 1 to 3, 1 to 4, 1 to 5, or 1 to 6 may yield a reduced vapor pressure electrolyte by about 1%, 5%, 10%, 20%, 30%, 40%, 50%, 60%, 70%, 80%, 90%, up to 99% reduction in pressure. The reduction in pressure will of course depend on the solvent, the salt, the salt to solvent ratio, and the temperature of the mixture. In the case where two or more solvents are used, the solvent described in the salt to solvent ratio may only be the solvents which show high binding energy to the lithium cation. In general, any liquefied gas solvent which shows a reduction in vapor pressure at a high enough salt concentration in the pure solvent may be mixed together to combine multiple solvents and an overall lower vapor pressure electrolyte. These solvents may also be mixed with solvents which are weakly binding to the salt cation. The cation may be any salt cation, but preferably lithium, sodium, calcium, magnesium, or potassium.

This reduction in vapor pressure may be so great as to effectively make the electrolyte a liquid at atmospheric pressure. Any reduction in electrolyte vapor pressure would benefit from ease of handling, use of common liquid dispensing techniques and equipment, cell housings and architectures including pouch and prismatic cells, and increased safety performance due to the lower pressure of the electrolyte.

In some instances, it may be desirable to maintain a vapor pressure of the liquefied gas electrolyte which is above atmospheric pressure but below the liquefied gas solvent's vapor pressure. For instance, to enhance the safety of the battery cell during a crush or puncture event, it is desirable to have an electrolyte which can evaporate out from the cell rapidly to prevent any short circuit in the battery and subsequent thermal runaway reactions. Having an electrolyte which can evaporate rapidly away from a punctured or crushed cell can be of high safety importance. The electrolyte may evaporate completely, with salt, or in part, with only the solvent evaporating away. The increase in cell impedance after electrolyte evaporation can prevent further cell short circuit and thermal runaway reactions. Thus, it may be desirable to optimize a vapor pressure to be above atmospheric pressure for safety but below the vapor pressure of the pure liquefied gas solvent for improved handling. By having a lower vapor pressure, the electrolyte within the electrochemical device does not have to be under as severe a pressure. This allows the housing and various device components to be less robust, and therefore easier and more efficient to manufacture. For instance, the housing wall thickness can be lower but still maintain the same structural integrity with a lower pressure electrolyte. This lowers the housing mass, volume, and cost, which are beneficial from a performance and cost perspective.

As shown in FIG. 2, a 15 M LiFSI electrolyte at room temperature is able to effectively facilitate the plating and stripping of lithium metal with low overpotential and no evidence of additional reactions of either salt or solvent. The smooth voltage trace suggests the electrolyte does not produce inhomogeneous growth or deleterious electrolyte side reactions.

As shown in FIG. 3, the 15 M LiFSI electrolyte at room temperature also possesses impressive high potential stability evident by the linear sweep voltammogram (LSV) from open circuit potential to 5 V vs Li/Li+. Stability of this electrolyte is shown to be as high as 4.5 V vs Li/Li+. Typical ether-based electrolytes are known for relatively low oxidation potential between 3-4 V vs Li/Li+.

FIG. 4 shows that the 15 M LiFSI electrolyte is also compatible with transition metal oxide cathodes found in lithium-ion batteries. The electrolyte is able to reversibly charge and discharge the lithium nickel-manganese-cobalt oxide cathode from open circuit potential to 4.2 V to 2.5 V.

As shown in FIG. 5, based on DFT calculations, the dimethyl ether solvent molecule possesses a higher ionization potential (about 9.9 eV) than other ether solvents, like diethyl ether (about 9.4 eV), dimethoxyethane (about 9.2 eV) and tetrahydrofuran (about 9.2 eV). Ionization potential is the energy required for a molecule is to lose an electron, or be oxidized, and correlates to a solvents oxidation resistance. Likewise, dimethyl ether also processes a lower electron affinity (about −1.55 eV) compared to diethyl ether (about −1.45 eV), dimethoxyethane (about 1.35 eV) and tetrahydrofuran (about −1.4 eV). Electron affinity is the energy required for a molecule to gain an electron, or be reduced, and correlates to a solvent's reduction resistance.

As shown in FIG. 6, based on DFT calculations, the binding energies of four different liquefied gas solvent types are compared: fluoromethane (CH3F), formaldehyde (H2CO), dimethyl ether ((CH3)2O), and trimethyl amine ((CH3)3N). The calculations were compared for a single solvent molecule binding to a single lithium cation. It is shown that the binding energy of formaldehyde (1.6 eV), dimethyl ether (1.72 eV) and trimethyl amine (1.82 eV) are substantially higher than fluoromethane (1.31 eV).

One embodiment is an electrochemical device comprising an ionically conducting electrolyte. The ionically conducting electrolyte may comprise one or more salts and, optionally one, or more additives. The one or more additives may be liquid, solid, or gas at a standard room temperature of 293.15K and at a standard pressure (approximately 100 kPa). The one or more salts may be liquid, solid, or gas at a standard room temperature of 293.15K and at a standard pressure (approximately 100 kPa).

Some such embodiments of electrochemical devices may further comprise a housing, enclosing the ionically conducting electrolyte and structured to provide a hermetically sealed condition to the one or more salts and to the solution of one or more solvents, such as liquefied gas solvents, and a pair of electrodes in contact with the ionically conducting electrolyte.

One of skill in the art will understand that the terms "one or more salts," "one or more solvents" (including "liquefied gas solvents" and "liquid solvents"), and "one or more additives," as used herein in connection with "the ionically conducting electrolytes," refer to one or a plurality of electrolyte components.

One embodiment the liquefied gas electrolyte comprises a liquefied gas solvent comprising of dimethyl ether, with one or more lithium based salts where the salt to solvent ratio is 3 to 1, 2 to 1, 1 to 1, 1 to 2, 1 to 3, 1 to 4, 1 to 5, or 1 to 6. In another embodiment, the liquefied gas solvent is comprised of other gaseous solvents having an ether oxygen structure such as methyl ethyl ether, methyl vinyl ether, ethylene oxide, desflurane, 1,1,2,2-tetrafluoro-1-(trifluoromethoxy) ethane, bis(difluoromethyl) ether, methyl pentafluoroethyl ether, or perfluoroethyl methyl ether. In another embodiment, the liquefied gas solvent is comprised of any other gaseous solvent having a carbonyl oxygen such as formaldehyde, ethenone, carbonyl sulfide, carbon suboxide, tris(difluoroamine) fluoromethane, or ethylamine, or trifluoroacetyl fluoride. In another embodiment, the liquefied gas solvent is comprised of any other gaseous solvent having an amine structure such as ammonia, methyl amine, dimethyl amine, or trimethyl amine.

These solvents showing a reduced vapor pressure with high salt concentrations may also be mixed with other liquefied gas solvents to improve electrochemical device performance such as fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, difluoro ethylene, nitrous oxide, nitrogen dioxide, nitrogen oxide, carbon disulfide, hydrogen fluoride, hydrogen chloride or any combination thereof. In some embodiments, the liquefied gas electrolyte includes a single liquefied gas solvent or a combination of liquefied gas solvent and one or more additives and/or one or more salts. These additives may be gaseous, liquid or solid at a standard room temperature of 293.15K and at a standard pressure (approximately 100 kPa). Further, any of the gaseous additives may also be used as a primary solvent.

In an exemplary electrochemical device using a liquefied gas electrolyte composed of one or more liquefied gas components with any combination of one or more liquid components, one or more solid components, or one or more salt components, the electrodes are composed of any combination of two electrodes of intercalation type such as graphite, carbon, activated carbon, vanadium oxide, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide, carbon, or chemical reaction electrode such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride or of a metallic electrode with lithium, sodium, magnesium, tin, aluminum, calcium, titanium zinc metal or metal alloy including lithium, sodium, tin, magnesium, aluminum, calcium, titanium, zinc, or any combination thereof. These components may be combined with various binder polymer components, including polyvinylidene fluoride, carboxymethyl cellulose, styrene-butadiene rubber, or polytetrafluoroethylene in order to maintain structural integrity of the electrode.

In some embodiments, the additives are used in combination with a liquefied gas solvent and lithium, sodium, zinc, calcium, magnesium, aluminum, or titanium-based salts. Further, the one or more liquefied gas solvent solution or electrolyte may be combined with one or more salts, including one or more of lithium bis(trifluoromethanesulfonyl) imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragaliumaluminate, lithium bis(oxalato)borate (LiBOB), lithium hexafluorostannate, lithium difluoro(oxalato)borate (LiDFOB), lithium bis(fluorosulfonyl)imide (LiFSI), lithium aluminum fluoride (LiAlF3), lithium nitrate (LiNO3), lithium chloroaluminate, lithium tetrafluoroborate (LiBF4), lithium tetrachloroaluminate, lithium difluorophosphate, lithium tetrafluoro(oxalato)phosphate, lithium difluorobis(oxalato)phosphate, lithium borate, lithium oxolate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, di-lithium squarate, lithium croconate dihydrate, dilithium rhodizonate, lithium oxalate, di-lithium ketomalonate, lithium di-ketosuccinate or any corresponding salts with the positively charged lithium cation substituted for sodium or magnesium or any combinations thereof. Further useful salts include those with positively charged cations such as tetramethylammonium, tetraethylammonium, tetrapropylammonium, tetrabutylammonium, triethylmethylammonium ammonium, spiro-(1,1')-bipyrrolidinium, 1,1-dimethylpyrrolidinium, and 1,1-diethylpyrrolidinium, N,N-diethyl-N-methyl-N(2-methoxyethyl)ammonium, N,N-Diethyl-N-methyl-N-propylammonium, N,N-dimethyl-N-ethyl-N-(3-methoxypropyl)ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalate)borate, bis(trifluoromethanesulfonyl) imide, bromide, chloride, dicyanamide, diethyl phosphate, hexafluorophosphate, hydrogen sulfate, iodide, methanesulfonate, methyl-phophonate, tetrachloroaluminate, tetrafluoroborate, and trifluoromethanesulfonate.

As discussed above, the reduction in vapor pressure of the electrolyte simplifies manufacturability of the electrochemical devices by allowing for cell housings that have thinner walls resulting in lower mass, volume and cost. For example, in co-pending U.S. Patent Application No. 63/391,220 filed on Jul. 21, 2022 describes an apparatus for premixing an electrolyte mixture for subsequent dispensing into an electrochemical device. FIG. 8 is taken from that application. A liquefied gas solvent that has a vapor pressure above 100 kPa at a temperature of 293.15K is mixed with an appropriate salt such that the salt to solvent ratio is sufficient to lower the vapor pressure of the electrolyte mixture to at least 90% of that of the pure liquefied gas solvent at a temperature of 293.15K. This mixture may be done in a container 4, wherein the container is constructed to accommodate the pressure of the liquefied gas solvent. The setup shown in FIG. 8 also includes a container isolation valve 12, liquefied gas electrolyte mixture 6 (with salt 5), and temperature sensor 7 used for dispensing liquefied gas electrolyte mixture 6 into a secondary container 24. The secondary container 24 may be any suitable metal, ceramic, or plastic apparatus capable of holding a liquefied gas electrolyte mixture that has a vapor pressure above an atmospheric pressure of 100 kPa at a temperature of 293.15 K. If, alternatively, the container holds a liquefied gas electrolyte mixture with a salt to solvent ratio sufficient to lower the vapor pressure below 100 kPa at a temperature of 293.15 K, then the container 4 need not be robust enough to withstand high pressures. Secondary container 24 may be an electrochemical device such as a battery or capacitor. Other filling set-ups are disclosed in co-pending U.S. Patent Application 63/391,220, the entire contents of which are incorporated herein by reference.

Using the setup in FIG. 8, the secondary container 24 may be a housing with an anode and cathode. The pre-mixed electrolyte is then dispensed into the housing allowing the anode and cathode to be in contact with the mixture. The housing may then be sealed, with electrical contacts connected to the anode and cathode and accessible from outside the housing. If the electrolyte mixture is above 100 kPa at a temperature of 293.15 K, then the dispensing step should be done at a pressure above 100 kPa, and the housing construction should be selected to maintain the electrolyte mixture above 100 kPa at a temperature of 293.15K after the housing is sealed. But the housing need not be as robust to maintain the higher pressures of the pure liquefied gas solvent or a liquefied gas electrolyte with a salt to salt ratio such that there is very little if any reduction in vapor pressure, thus simplifying manufacturability of the electrochemical device by allowing for cell housing that have thinner walls resulting in lower mass, volume and cost.

Alternatively, if the electrolyte mixture is below 100 kPa at a temperature of 293.15 K, then the dispensing step should be done at atmospheric pressure or lower. In this latter case, the housing need not be as robust because the electrolyte mixture is not under pressure, even further simplifying manufacturability and lowering cost.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made without departing from the scope and spirit of this invention, based on what is described and illustrated in this patent document.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. An ionically conducting electrolyte mixture comprising:

a liquefied gas solvent that has a vapor pressure above 100 kPa at a temperature of 293.15K; and a salt;

wherein the salt to liquefied gas solvent ratio is sufficient to lower the vapor pressure of the liquefied gas solvent and salt solution to below 100 kPa at a temperature of 293.15K; and wherein the liquefied gas solvent is comprised of dimethyl ether or a solvent having an amine nitrogen group selected from the group consisting of ammonia, methyl amine, dimethyl amine, trimethyl amine, tris(difluoroamine) fluoromethane, and ethylamine; and wherein the salt to solvent ratio ranges from about 3:1 to 1:6.

2. The mixture of claim 1, wherein the salt is at least one selected from the group consisting of LiTFSI, LiFSI, LiPF6, LiBOB, LiBF4, LiDFOB, LiNO3, and any combination thereof.

3. The mixture of claim 1, wherein the liquefied gas solvent is further comprised of: fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, bromine, iodine, molecular oxygen, molecular nitrogen, carbon monoxide, carbon dioxide, sulfur dioxide, difluoro ethylene, nitrous oxide, nitrogen dioxide, nitrogen oxide, carbon disulfide, hydrogen fluoride, hydrogen chloride or any combination thereof.

4. An electrochemical device comprising:

the ionically conducting electrolyte mixture of claim 1;

an anode in contact with the mixture;

a cathode in contact with the mixture; and a housing enclosing the mixture, the anode and the cathode.

5. The electrochemical device of claim 4, wherein the cathode is selected from a group consisting of: graphite, carbon, activated carbon, vanadium oxide, and lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, and lithium nickel cobalt aluminum oxide.

6. The electrochemical device of claim 4, wherein the anode is comprised of one or more of: lithium metal, sodium metal, calcium metal, magnesium metal, aluminum metal, and zinc metal.

7. The electrochemical device of claim 4, wherein the salt of the mixture is at least one selected from the group consisting of LiTFSI, LiFSI, LiPF6, LiBOB, LiBF4, LiDFOB, LiNO3, and any combination thereof.

8. The electrochemical device of claim 4, wherein the liquefied gas solvent of the mixture is further comprised of: fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2- trifluoropropane, fluoroethylene, cis-1,2-fluoroethylene, 1,1-fluoroethylene, 1-fluoropropylene, 2-propylene, chlorine, bromine, iodine, molecular oxygen, molecular nitrogen, carbon monoxide, carbon dioxide, sulfur dioxide, difluoro ethylene, nitrous oxide, nitrogen dioxide, nitrogen oxide, carbon disulfide, hydrogen fluoride, hydrogen chloride or any combination thereof.

9. The electrochemical device of claim 4, wherein the device is a capacitor or a battery.

* * * * *